Nov. 22, 1932.  G. HOLST ET AL  1,888,628
CIRCUIT ARRANGEMENT FOR SMOOTHING RECTIFIED ALTERNATING VOLTAGES
Filed May 18, 1927
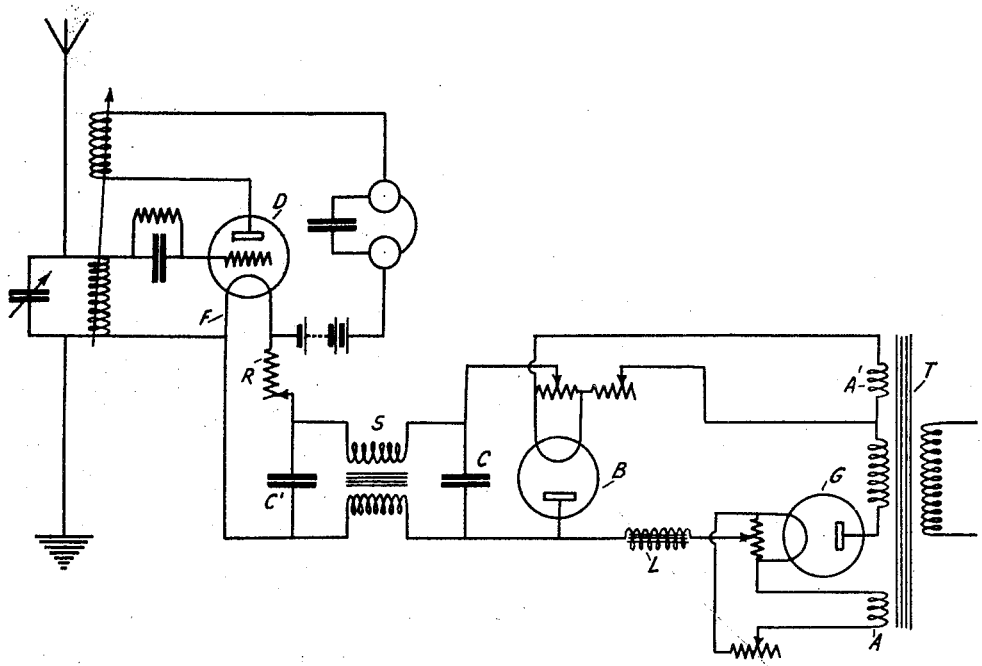
INVENTOR
GILLES HOLST
EKKO OOSTERHUIS
BY
ATTORNEY Patented Nov. 22, 1932

1,888,628

UNITED STATES PATENT OFFICE

GILLES HOLST AND EKKO OOSTERHUIS, OF EINDHOVEN, NETHERLANDS, ASSIGNORS TO RADIO CORPORATION OF AMERICA, A CORPORATION OF DELAWARE

CIRCUIT ARRANGEMENT FOR SMOOTHING RECTIFIED ALTERNATING VOLTAGES

Application filed May 18, 1927, Serial No. 192,229, and in the Netherlands May 20, 1926.

The invention relates to the so-called smoothing of rectified alternating currents. The latter, no matter whether they come from mechanical, electrolytic or thermionic rectifiers, always show to a greater or lesser extent, periodic fluctuations which give rise to the production of so-called "ripples". The frequency of these ripples is closely connected with that of the rectified alternating current.

Various means for smoothing out or planishing these ripples have been suggested. Usually these means comprise one or more condensers combined with choking coils or ohmic resistances. In the case of very low current intensities with rather high potentials the purpose in view can be attained thereby to a sufficient extent. An example which may be mentioned is the feeding of the plate circuits of thermionic apparatus with rectified alternating current.

If, however, large currents at a low voltage are desired such as heating currents for the cathodes of thermionic apparatus, it would be necessary to use condensers of such large capacity that practical realization of a sufficiently smoothed out or rippleless current would be impossible.

The invention has for its object to provide a circuit arrangement with which rectified alternating currents, and even those of comparatively large current and low voltage, can be smoothed out to a sufficient extent and in a simple manner.

According to the invention, an incandescent cathode discharge tube with an enclosed arc discharge is connected in parallel with the terminals of the rectifier and in series with an alternating current resistance.

In fact, these tubes possess the property favourable for the purpose under consideration, which is that during fluctuations of the current intensity the potential between the electrodes, at least above a certain limiting value, remains constant and is at the same time of the order of magnitude of the voltages usually employed for feeding the filaments of thermionic valves. If care is taken to remain above this limiting value, a working circuit connected between the electrode terminals of the discharge tube will be traversed by a direct current substantially without any ripples. The potential in this working circuit also has a determinable constant value which is independent within reasonable limits of the working current in this circuit.

Further features of the invention will appear from the following description. The invention will be described with reference to the accompanying diagram.

The primary side of the transformer T is connected to alternating current mains. One end of the secondary winding is connected to the plate of a thermionic rectifier G, the other end of the secondary winding is connected in series with the discharge tube B having an enclosed arc discharge and a self-induction coil L to the cathode of the tube G. The filaments of the tubes B and G are fed by a pair of auxiliary windings A and A' of the transformer T.

The terminals of the tube B are connected with a smoothing device of known type consisting of choke coil S and condensers C and C' one of which is connected across the input terminals and the other across the output terminals, of the choke coil S. The filament F of a detector D is connected to the terminals of the condenser C' with the usual adjustable resistance R.

The two tubes G and B may advantageously be tubes having an atmosphere of one or more rare gases and a cathode (for example, an oxide cathode) which emits at a low temperature. This kind of tube gives an arc discharge of rather large current density at low tension. A further advantage of this kind of tube lies in its resistance characteristic, that is between wide limits the voltage remains practically constant for large changes in the current intensity. This causes the potential between the terminals of the tube B to show practically no fluctuation notwithstanding the fact that the current in that tube is a pulsating direct current. A rough smoothing out of this pulsating current is first secured however by a self induction coil L so that the current passing through B may be considered as a sine-shaped alternating current superimposed on a direct current. The curve plotted for the voltage between the terminals of the tube B will be very nearly a straight line and only faintly follows the sine-shaped course of the current curve. The "ripple" which is left is consequently insignificant and if need be, it can be further eliminated without any difficulty with the aid of one of the known capacitive smoothing out means. It is advisable to add some mercury vapor to the one or more rare gases in the tube B. The mercury vapor causes the constant tension between the electrodes of the tube B to lie in the neighborhood of 4 volts, said tension being commonly used for the filaments of wireless valves. If the mercury is dispensed with, the constant voltage of the tube when containing argon is about 8 volts.

If desired, the self induction L may be replaced by some other alternating current resistance provided the resistance converts the current impulses, which pass through the rectifier, and are separated by pauses, into a direct current which is uninterrupted; although showing ripples more or less strongly marked.

What we claim is:

1. In radio apparatus, an alternating current source, a rectifier tube fed thereby, a load circuit, an enclosed arc discharge tube comprising a coated cathode and an anode in an atmosphere consisting of at least one rare gas and at least one metal vapor, a filter network including choke coils and condensers connecting the terminals of said load circuit to the terminals of said discharge tube and means including an alternating current resistance for connecting said discharge tube in parallel with said rectifier tube.

2. In radio apparatus, an alternating current source, a rectifier tube fed thereby, a load circuit, an enclosed arc discharge tube comprising a coated filamentary cathode and an anode in an atmosphere consisting of at least one rare gas and at least one metal vapor, a resistance shunted across said cathode, a filter network including choke coils and condensers connecting the terminals of said load circuit respectively to substantially the mid-point of said resistance and to the anode of said discharge tube and means for connecting said discharge tube in parallel with said rectifier tube.

3. In radio apparatus, an alternating current source, a rectifier tube fed thereby, a load circuit, an enclosed arc discharge tube comprising a coated filamentary cathode and an anode in an atmosphere consisting of at least one rare gas and at least one metal vapor, a resistance shunted across said cathode, a filter network including choke coils and condensers connecting the terminals of said load circuit respectively to a point intermediate the ends of said resistance and to the anode of said discharge tube and means comprising an inductance coil for connecting said discharge tube in parallel with said rectifier tube.

GILLES HOLST.
EKKO OOSTERHUIS.